United States Patent
Agesen et al.

(10) Patent No.: US 8,572,606 B1
(45) Date of Patent: Oct. 29, 2013

(54) SYSTEM AND METHOD FOR AVOIDING SYNCHRONIZATION BUGS THROUGH VIRTUALIZATION

(75) Inventors: Ole Agesen, Palo Alto, CA (US); Michael Cohen, Boston, MA (US); Jeffrey W. Sheldon, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 2108 days.

(21) Appl. No.: 11/365,012

(22) Filed: Mar. 1, 2006

Related U.S. Application Data

(60) Provisional application No. 60/755,046, filed on Dec. 29, 2005.

(51) Int. Cl.
*G06F 9/455* (2006.01)

(52) U.S. Cl.
USPC ............................................................. 718/1

(58) Field of Classification Search
USPC ............................................................. 718/1
See application file for complete search history.

(56) References Cited

U.S. PATENT DOCUMENTS

| | | | | |
|---|---|---|---|---|
| 6,704,925 | B1 * | 3/2004 | Bugnion | 717/138 |
| 7,080,374 | B2 * | 7/2006 | Dahlstedt et al. | 718/1 |
| 7,243,267 | B2 * | 7/2007 | Klemm et al. | 714/38 |
| 2004/0230975 | A1 * | 11/2004 | Gewirtz et al. | 718/100 |
| 2005/0268338 | A1 * | 12/2005 | Made | 726/24 |

OTHER PUBLICATIONS

VMware Internal Documentation, various dates, 8 pages.

* cited by examiner

*Primary Examiner* — Mengyao Zhe

(57) ABSTRACT

A system and method for reducing the likelihood of concurrency errors by identifying vulnerable segments of computer code and stalling other virtual machine threads of execution. According to one embodiment of the present invention, the vulnerable segment is identified at runtime, for example in a dynamic translator. According to another embodiment of the present invention, the vulnerable segment is identified ahead of time, for example in a static translator. According to yet another embodiment of the present invention, the vulnerable segment is identified in the binary translator of a virtual machine monitor.

20 Claims, 11 Drawing Sheets

SYSTEM AND METHOD FOR AVOIDING SYNCHRONIZATION BUGS THROUGH VIRTUALIZATION

U.S. Provisional Patent Application No. 60/755,046 Filed 29 Dec. 2005.

BACKGROUND OF THE INVENTION

1. Field of the Invention

This invention relates generally to computer virtualization and, in particular, to a method and system for avoiding synchronization bugs through virtualization.

2. Description of Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization also provides greater stability, since the virtualization can isolate potentially unstable or unsafe software so that it cannot adversely affect the hardware state or system files required for running the physical (as opposed to virtual) hardware.

As is well known in the field of computer science, a virtual machine (VM) is a software abstraction—a "virtualization"—of an actual physical computer system. FIG. 1(a) shows one possible arrangement of a computer system 101 that implements virtualization. A virtual machine (VM) 102, which in this system is a "guest," is installed on a "host platform," or simply "host," which will include a system hardware 100, that is, a hardware platform, and one or more layers or co-resident components comprising system-level software, such as an operating system (OS) or similar kernel, a virtual machine monitor or hypervisor (see below), or some combination of these.

As software, the code defining the VM will ultimately execute on the actual system hardware 100. As in almost all computers, this hardware will include one or more CPUs 120, some form of memory 130 (volatile or non-volatile), one or more storage devices such as one or more disks 140, and one or more devices 170, which may be integral or separate and removable.

In many existing virtualized systems, the CPU(s) 120 are the same as in a non-virtualized computer with the same platform, for example, the Intel x86 platform. Because of the advantages of virtualization, however, some hardware vendors have proposed, and are presumably developing, hardware processors that include specific hardware support for virtualization.

Each VM 102 will typically mimic the general structure of a physical computer and as such will usually have both virtual system hardware 104 and guest system software 106. The virtual system hardware typically includes at least one virtual CPU 108, virtual memory 112, at least one virtual disk 116, and one or more virtual devices 110. Note that a storage disk—virtual 116 or physical 140—is also a "device," but is usually considered separately because of the important role it plays. A virtual CPU may also sometimes be referred to as a virtual processor. The term 'virtual processor' is synonymous with the term 'virtual CPU' or 'VCPU' for the purposes of reference throughout this text. All of the virtual hardware components of the VM may be implemented in software to emulate corresponding physical components. The guest system software includes a guest operating system (OS) 122 and drivers 124 as needed, for example, for the various virtual devices 110.

To permit computer systems to scale to larger numbers of concurrent threads, systems with multiple CPUs have been developed. Many conventional hardware platforms therefore include more than one hardware processor 120. In many such platforms, each processor is a separate "chip" and may share system resources such as main memory and/or at least one I/O device. "Multi-cored" architectures have also been developed (for example, IBM POWER4 and POWER5 architectures, as well as the Sun UltraSparc IV), in which more than one physical CPU is fabricated on a single chip, with its own set of functional units (such as a floating-point unit and an arithmetic/logic unit ALU), and can execute threads independently. Multi-cored processors typically share only very limited resource, such as at least some cache.

Still another modern technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB). One example of a multi-threaded architecture is Intel Corporation's "Hyper-Threading Technology," used to improve the performance of its Pentium IV and Xeon processor lines. It is also possible to have an architecture that is both multi-cored and multi-threaded.

Similarly, a single VM may also have (that is, be exposed to) more than one virtualized processor. Symmetric multiprocessor (SMP) systems are commonly available, and may be implemented in both virtualized and non-virtualized systems. Essentially, an SMP system is a hardware platform that connects multiple processors to a shared main memory and shared I/O devices. Virtual machines may also be configured as SMP VMs. FIG. 1(a), for example, illustrates multiple virtual processors 108 within the VM 102. Each virtualized processor in a VM may also be multi-cored, or multi-threaded, or both, depending on the virtualization.

Applications 126 running on the VM will typically function as they would if run on a "real" computer, even though the applications are running at least partially indirectly, that is via the guest OS 122 and virtual processor(s). Executable files will be accessed by the guest OS from the virtual disk 116 or virtual memory 112, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is usually required between a VM 102 and the underlying host platform (in particular, the hardware CPU (s) 120 and any intermediate system-level software layers), which is (are) responsible for actually submitting and executing VM-issued instructions and for handling I/O operations, including transferring data to and from the hardware memory 130 and storage devices 140. A common term for this interface or virtualization layer is a "virtual machine monitor" (VMM), shown as component 128. A VMM is usually a software component that virtualizes at least some of the resources of the physical host machine, or at least some hardware resource, so as to export a hardware interface to the VM corresponding to the hardware the VM "thinks" it is running on. As FIG. 1(a) illustrates, a virtualized computer system may (and usually will) have more than one VM, each of which may be running on its own VMM.

The various virtualized hardware components in the VM, such as the virtual CPU(s) 108, the virtual memory 112, the virtual disk 116, and the virtual device(s) 110, are shown as being part of the VM 102 for the sake of conceptual simplicity. In actuality, these "components" are often implemented as software emulations included in the VMM.

In contrast to a fully virtualized system, the guest OS 122 in a so-called "para-virtualized" system is modified to support virtualization, such that it not only has an explicit interface to the VMM, but is sometimes also allowed to access at least one host hardware resource directly. In some para-virtualized systems, one of a plurality of VMs plays a "superior" role in that it mediates some requests for hardware resources made by the guest OSs of other VMs. In short, virtualization transparency is sacrificed to gain speed or to make it easier to implement the VMM that supports the para-virtualized machine. In such para-virtualized systems, the VMM is sometimes referred to as a "hypervisor."

In addition to the distinction between full and partial (para-) virtualization, two arrangements of intermediate system-level software layer(s) are in general use—a "hosted" configuration (illustrated in FIG. 1(b)) and a non-hosted configuration (illustrated in FIG. 1(a)). In a hosted virtualized computer system, an existing, general-purpose operating system forms a "host" OS that is used to perform certain input/output (I/O) operations, alongside and sometimes at the request and direction of the VMM 128. The host OS 132, which usually includes drivers 134 and supports applications 136 of its own, and the VMM are both able to directly access at least some of the same hardware resources, with conflicts being avoided by having the VMM transparently save and restore host state when switching between the host and the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002), which is incorporated by reference herein in its entirety.

In addition to device emulators 138, FIG. 1(b) also illustrates some of the other components that are also often included in the VMM 128 of a hosted virtualization system; many of these components are found in the VMM 128 of a non-hosted system as well. For example, exception handlers 142 may be included to help execute the virtual machine instruction stream, and a direct execution engine 144 and a binary translator 146 with associated translation cache 148 may be included to provide execution speed while still preventing the VM from directly executing certain privileged instructions. According to one embodiment of the present invention, a translation cache 148 may be included for every virtual CPU 108. The binary translator 146 may be implemented as computer code stored on a computer readable medium.

In many cases, it may be beneficial to deploy VMMs on top of a software layer—a kernel 152—constructed specifically to provide efficient support for the VMs. This configuration is frequently referred to as being "non-hosted." Compared with a system in which VMMs run directly on the hardware platform (such as shown in FIG. 1(b)), use of a kernel 152 offers greater modularity and facilitates provision of services (for example, resource management) that extend across multiple virtual machines. Compared with a hosted deployment, a kernel may offer greater performance because it can be co-developed with the VMM 128 and be optimized for the characteristics of a workload consisting primarily of VMs/VMMs. The kernel 152 also handles any other applications running on it that can be separately scheduled, as well as any temporary "console" operating system 132 that, in some systems, is included to boot the system as a whole and for enabling certain user interactions with the kernel. The console OS 132 in FIG. 1(a) may be of the same type as the host OS in FIG. 1(b), which is why they are identically numbered—the main difference is the role they play (or are allowed to play, if any) once the virtualized computer system is loaded and running.

In practice, the applications 126 and the guest operating system 122 sometimes contain glitches that can result in undesirable consequences. While effort is usually made to produce error-free software, the size and scope of these systems and applications makes the occasional appearances of errors, or 'bugs', inevitable. Typically, users must work with these errors, or if a problem is severe enough, the manufacturer of the system or application will release a patch.

Sometimes virtualization exposes errors in the applications 126 or guest operating system 122 that are not apparent in the non-virtualized use of the system or application. For example, synchronization bugs may go undetected when they depend on a statistically unlikely series of events. However, changes to the speed of execution in a multithreaded or multiprocessor environment, such as a virtualized device responding slower or faster than its physical analogue, sometimes increase the likelihood that a synchronization bug may result in a concurrency error. A concurrency error, generally, is an error that occurs when two threads of execution attempt to access the same data simultaneously, or when an improper interaction between threads of execution results in the corruption of data.

As these bugs may only be significantly exposed in certain conditions, such as when the operating system or application is run by a virtual machine, it is possible that the manufacturer of the operating system or application may have ended-of-lifed the product. In some cases, the error may make the operating system or application unusable entirely.

What is needed is a system and method for reducing the likelihood of concurrency errors in applications and operating systems.

SUMMARY OF THE INVENTION

The invention is a system and method for reducing the likelihood of concurrency errors by identifying vulnerable segments of computer code and stalling other virtual machine threads of execution.

According to one embodiment of the present invention, a vulnerable segment of computer code is identified in translation and steps are taken to allow for the safe execution of the vulnerable segment. According to one embodiment of the present invention, the vulnerable segment is identified at runtime, for example in a dynamic translator. According to another embodiment of the present invention, the vulnerable segment is identified ahead of time, for example in a static translator. According to yet another embodiment of the present invention, the vulnerable segment is identified sometimes at runtime and sometimes ahead of time, for example in a translator having a translation cache.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

According to one embodiment of the present invention, a vulnerable segment of computer code is identified in translation and steps are taken to allow for the safe execution of the vulnerable segment. A vulnerable segment of computer code contains computer instructions known to cause errors when executed by a virtual machine thread of execution. For example, a vulnerable segment may contain a synchronization bug, i.e., it may contain computer instructions likely to cause a concurrency error when executed by a virtual machine thread of execution sharing resources with another virtual machine thread of execution. A vulnerable segment of code may contain computer instructions also likely to cause errors when executed by a physical CPU without the introduction of virtualization.

Figure 1A:
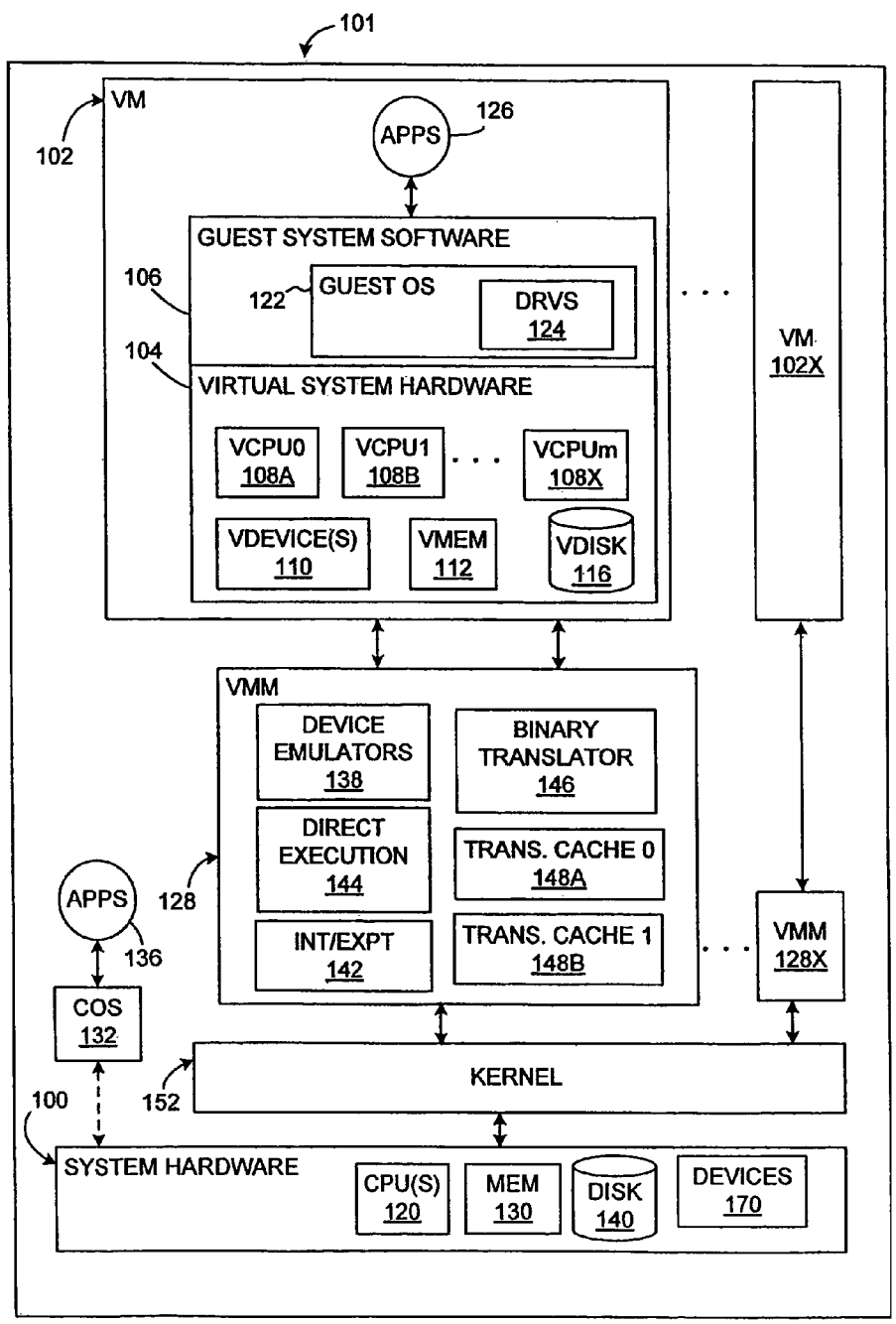
FIG. 1(a) shows one example of a computer system 101 that implements virtualization in which the present invention can operate.
Figure 1B:
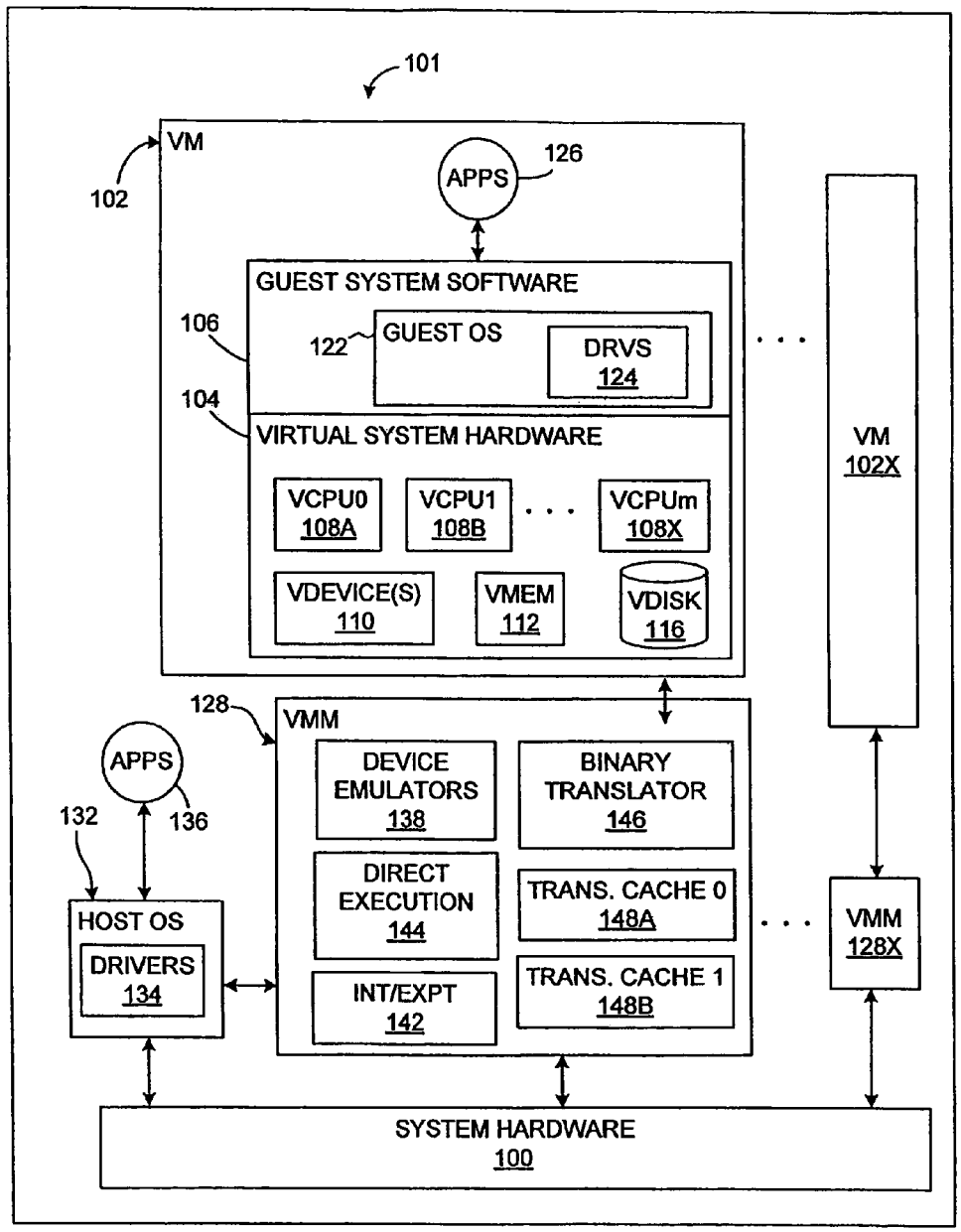
FIG. 1(b) shows another example of a computer system 101 that implements virtualization in which the present invention can operate.

A virtual machine thread of execution is an execution context for a virtualized processor. For example, a virtual machine thread of execution may be implemented by a thread running on a virtualized machine, an application executing through dynamic translation, or a virtual CPU such as the VCPU0 108A described herein with reference to FIG. 1. This list of examples is given for the purpose of illustration and is not limiting. Other implementations of virtual machine threads of execution may be implemented without departing from the scope of the present invention.

According to one embodiment of the present invention, a vulnerable segment of computer code that contains a synchronization bug is identified in translation and steps are taken to allow for the safe execution of the vulnerable segment.

According to one embodiment of the present invention, a vulnerable segment of computer code is identified in the binary translator of a virtual machine monitor. FIGS. 1-6 illustrate a method for a virtual machine monitor implementing a binary translator, as one example of a translator in which vulnerable segments of computer code can be identified. Further details regarding virtual machine monitors and binary translators are described in U.S. Pat. No. 6,397,242, referenced above.

As described above, FIGS. 1a and 1b depict hosted and non-hosted implementations of virtualized computer systems. It will be apparent to one of skill in the art that the invention is applicable at least to both such implementations of virtualized computer systems, as well as non-virtualized computer systems.

Figure 2:
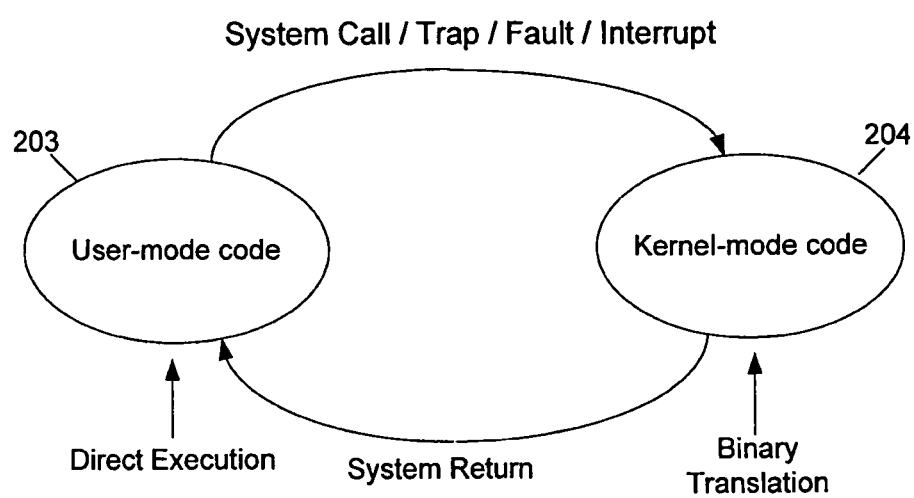
FIG. 2 is an illustration of a method for switching between direct execution and binary translation, according to one embodiment of the present invention.

FIG. 2 is an illustration of a method for switching between direct execution and binary translation, according to one embodiment of the present invention. The method may be performed by a virtual machine monitor, such as the one described herein with reference to FIG. 1.

In direct execution, code is executed directly by the CPU 120. User-mode code 203 is code that does not require special privileges or translation. By directly executing user-mode code 203, the system is able to rapidly execute code and limit the performance cost of virtualization.

Kernel-mode code 204 is code that requires special privileges or intervention by the virtual machine monitor to execute properly. The virtual machine monitor performs binary translation on the kernel-mode code 204 to ensure successful execution of the code. Binary translation is one example of an operation that provides the opportunity to identify vulnerable segments of code. A method of binary translation will be described in greater detail herein with reference to FIGS. 4-8.

The virtual machine monitor (VMM) 128 switches from direct execution of user-mode code 203 to binary translation of kernel-mode code 204 in response to a system call, a fault, a trap, or an interrupt. The virtual machine monitor 128 switches from binary translation of kernel-mode code 204 to direct execution of user-mode code 203 in response to a system return, fault return, trap return, or an interrupt return. A method for switching between direct execution and binary translation will be described herein with reference to FIG. 4.

Figure 3:
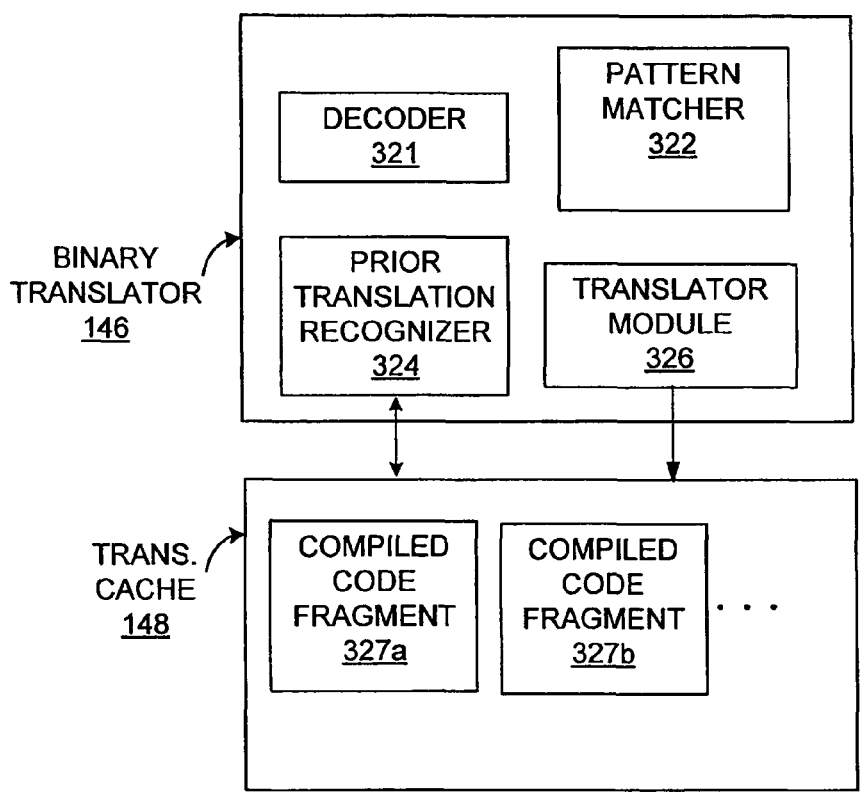
FIG. 3 is a block diagram illustrating a binary translator and a translation cache, according to one embodiment of the present invention.

FIG. 3 is a block diagram illustrating a binary translator and a translation cache, according to one embodiment of the present invention.

Compiled code fragments 327 are the output of the binary translator, and are segments of code capable of being executed by the CPU 120. According to one embodiment of the present invention, each compiled code fragment 327 can be identified and retrieved on the basis of a source key. A source key is an identifier from which a translation unit can be retrieved. For example, a source key may be based on a combination of at least one of the instruction pointer value, base address, limit, physical address, and mode of the instructions of the translation unit. Other methods for referring to translation units may be implemented without departing from the scope of the present invention.

The binary translator 146 includes a decoder 321. The decoder is capable of retrieving the instructions indicated by a source key and decoding those instructions to create a translation unit. A translation unit is computer is a data structure describing computer code ready to be translated. The binary translator converts translation units into corresponding compiled code fragments. The compiled code fragments 327 may include computer instructions to execute code outside of the translation cache 148 or to request a return to direct execution.

A translation unit and its corresponding compiled code fragment may be identified by a common source key.

The binary translator also includes a pattern matcher 322. The pattern matcher is capable of efficiently detecting occurrences of a predetermined segment of computer code, and may be implemented for example, using any of the well-known methods for pattern detection such as byte-for-byte matching. When one of these well-known methods is implemented to detect known vulnerable segments, the pattern matcher is capable of identifying vulnerable segments of computer code.

The binary translator also includes a prior translation recognizer 324. The prior translation recognizer 324 is capable of identifying computer code for which a translated compiled code fragment 327 is already stored in the translation cache 148.

The binary translator also includes a translator module 326. The translator module 326 is capable of receiving a translation unit, producing a compiled code fragment, and storing the compiled code fragment in the translation cache 148. A method used by the translator module 326, according to one embodiment of the present invention, is described in greater detail herein with reference to FIG. 5.

According to one embodiment of the present invention, the translation cache 148 is implemented as a computer readable medium capable of storing computer code such as compiled code fragments.

Figure 4:
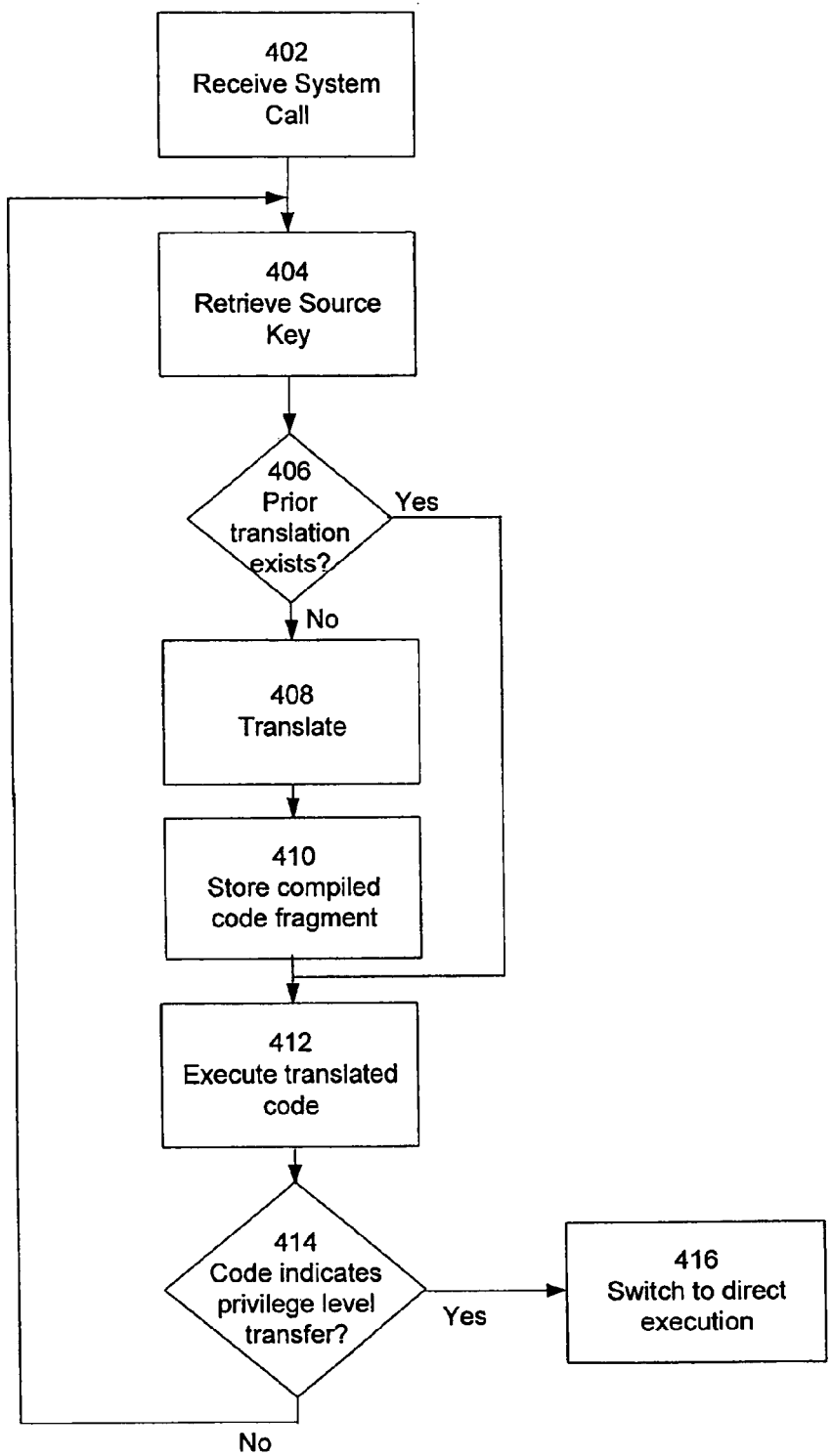
FIG. 4 is a flow chart illustrating a method for responding to a system call or other events, according to one embodiment of the present invention.

A method used by the binary translator 146, according to one embodiment of the present invention, is described in greater detail herein with reference to FIG. 4.

FIG. 4 is a flow chart illustrating a method for responding to a system call, or one of the other events described herein with reference to FIG. 2, according to one embodiment of the present invention. According to one embodiment of the present invention, the method is performed by the binary translator 146.

The binary translator 146 receives (Step 402) a system call. A system call is a message indicating that the currently running application requires the completion of a task necessitating privileged execution of some code. System calls typically mark a shift in execution from the application to the operating system, or for example, in the case of virtualized machine, from the applications 136 to the guest operating system 122. According to one embodiment of the present invention, in response to a system call the virtual machine monitor 128 switches to binary translation and sends a message to begin translation which is received (Step 402) by the binary translator 146. A method for switching from direct execution to binary translation, according to one embodiment of the present invention, is described herein with reference to FIG. 2.

The binary translator 146 retrieves (Step 404) a source key. The source key may, for example, be generated on the basis of the instruction pointer of the processor at the time of the call to the binary translator 146.

The binary translator 146 determines (Step 406) if a prior translation exists. According to one embodiment of the present invention, the binary translator 146 uses the prior translation recognizer 324 to determine (Step 406) if a compiled code fragment 327 associated with the source key retrieved in 404 is already stored in the translation cache 148. If the binary translator 146 determines (Step 406) that a prior translation exists, the binary translator 146 then executes 412 the translated code.

If the binary translator 146 determines (Step 406) that a prior translation does not exist, the binary translator 146 performs translation (Step 408). According to one embodiment of the present invention, the binary translator 146 uses the translator module 326 to translate a segment of code associated with the source key retrieved in 404. A method used by the translator module, according to one embodiment of the present invention, is described herein with reference to FIG. 5.

The translation (Step 408) produces a compiled code fragment. According to one embodiment of the present invention, performing translation (Step 408) provides an opportunity to identify vulnerable segments of code in the translation unit and to insert computer code ensuring the safe execution of the vulnerable segment into the compiled code fragment. A method for identifying and handling vulnerable segments of code will described in greater detail herein with reference to FIGS. 6-8.

The binary translator 146 stores (Step 410) the compiled code fragment. According to one embodiment of the present invention, the binary translator 146 stores (Step 410) the compiled code fragment in the translation cache 148. The compiled code fragment stored in the translation cache 148 may include computer code for stalling and resuming other virtual machine threads of execution, for example, when a compiled code fragment's corresponding translation unit contains a vulnerable segment of code capable of creating a concurrency error. A method for stalling and resuming other virtual machine threads of execution will be described herein with reference to FIGS. 6-8.

The binary translator 146 executes (Step 412) the translated code. According to one embodiment of the present invention, the binary translator 146 instructs the CPU 120 to execute the compiled code fragment stored (Step 410) in the translation cache 148. The compiled code fragment executed by the CPU 120 may have been translated (Step 408) and stored (Step 410) by the binary translator 146 in the current call to the binary translator 146, or it may have been translated (Step 408) and stored (Step 410) by the binary translator 146 in a previous call to the binary translator 146.

The binary translator 146 determines (Step 414) if the translated code indicates a privilege level transfer. According to one embodiment of the present invention, the binary translator 146 may determine (Step 414) if the translated code indicates a privilege level transfer by searching for instructions typically used to return control of a system to an application. Examples of privilege level transfer instructions used on the Intel x86 architecture include IRET, LRET, SYSRET, and SYSEXIT. Other privilege level transfer instructions and other architectures may be implemented without departing from the scope of the present invention.

If the binary translator 146 determines (Step 414) that the translated code does not indicate a privilege level transfer, the binary translator returns to retrieve 404 another source key.

If the binary translator 146 determines (Step 414) that the translated code indicates a privilege level transfer, the binary translator switches (Step 416) to direct execution. The binary translator may switch (Step 416) to direct execution by loading the guest application state into the registers of the CPU 120 and executing a privilege level transfer instruction to switch to user mode at the appropriate place in the application code. According to one embodiment of the present invention, the execution (Step 412) of the translated code may result in a switch to direct execution.

FIG. 5 is a flow chart illustrating a method for translating computer instructions, according to one embodiment of the present invention. According to one embodiment of the present invention, the method is performed by the translator module 326.

The translator module 326 retrieves (Step 502) a translation unit. According to one embodiment of the present invention, retrieving (Step 502) a translation unit includes receiving a source key, retrieving the computer code associated with the source key, and decoding the computer code using the decoder 321 to produce a translation unit.

The translator module 326 determines (Step 504) if the translation unit matches a pattern indicating that the translation unit contains a vulnerable segment of code. For example, the translator module 326 may determine if the translation unit matches a pattern suggesting that the translation unit contains code likely to cause a concurrency error.

According to one embodiment of the present invention, the translator module 326 uses the pattern matcher 322 to determine if the translation unit matches a translation unit known to contain a vulnerable segment of code.

For the purposes of illustration, the use of a pattern matcher has been selected as an example of one method by which the translator module 326 may determine if the translation unit contains a vulnerable segment of code. According to various embodiments of the present invention, different methods for determining if the translation unit contains a vulnerable segment of code may be implemented. For example, the translator module 326 may determine if the translation unit contains a vulnerable segment of code by searching for code indicative of a synchronization bug, learning from past errors to expose segments of code likely to be at fault for concurrency errors, or intelligently detecting the presence of improper synchronization. A variety of other methods for determining if the translation unit contains a vulnerable segment of code may be implemented without departing from the scope of the present invention.

If the translator module 326 determines (Step 504) that the translation unit matches a pattern indicating that the translation unit contains a vulnerable segment of code, the translator module 326 writes (Step 508) a translation of the vulnerable segment of code to a compiled code fragment. The translation written (Step 508) by the translator module 326 contains instructions to improve the likelihood that the vulnerable segment of code will execute successfully. Examples of translations in response to vulnerable segments of code that might improve the likelihood that the vulnerable segment of code will execute successfully are described herein with reference to FIGS. 6-8. According to one embodiment of the present invention, the likelihood of encountering a concurrency error in the vulnerable segment may be reduced to zero.

If the translator module 326 determines (Step 504) that the translation unit does not match a pattern indicating that the translation unit contains a vulnerable segment of code, the translator module 326 determines (Step 510) if the next instruction in the translation unit affects the control flow. The translator module 326 may determine (Step 510) if the next instruction in the translation unit affects the control flow, for example, by examining the prefix of the next instruction in the translation unit. According to one embodiment of the present invention, the prefix examined by the translator module 326 may be of length one. If the translator module 326 determines (Step 510) that the next instruction in the translation unit affects the control flow, the translator module 326 writes (Step 512) a control flow translation to the compiled code fragment.

Computer instructions that affect control flow are illustrated herein as an example of a kind of instruction in a translation unit requiring special translation. In practice a series of determinations may be made in the translator module 326 to translate the translation unit appropriately. If the translator module 326 determines (Step 510) that the next instruction in the translation unit does not affect control flow, the translator module 326 may make any number of further determinations regarding appropriate translation of the translation unit.

If the translator module 326 determines (Step 510) that the next instruction in the translation unit does not affect control flow, the translator module 326 determines (Step 514) if the next instruction in the translation unit is a privileged instruction. If the translator module 326 determines (Step 514) that the next instruction in the translation unit is a privileged instruction, the translator module 326 writes (Step 515) a translation of the privileged computer instruction to the compiled code fragment.

Determining (Step 514) if the next instruction in the translation unit is a privileged instruction has been selected for the purposes of illustration as an example of a last test in a series of tests to determine if the next instruction in translation unit requires some form of special translation. If the translator module 326 determines (Step 514) that the next instruction in the translation unit is not a privileged instruction, the translator module 326 writes (Step 516) the next instruction in the translation unit to the compiled code fragment, e.g., this can be an identical translation.

According to one embodiment of the present invention, if the next instruction in the translation unit does not require special translation or vulnerability handling, the translator module 326 writes (Step 516) the next computer instruction of the translation unit to the compiled code fragment using a default translation mode, for example, by writing the next computer instruction of the compiled code fragment identically to the compiled code fragment. According to one embodiment of the present invention, multiple computer instructions of the translation unit may be written (Step 516) to the compiled code fragment.

Figure 5A:
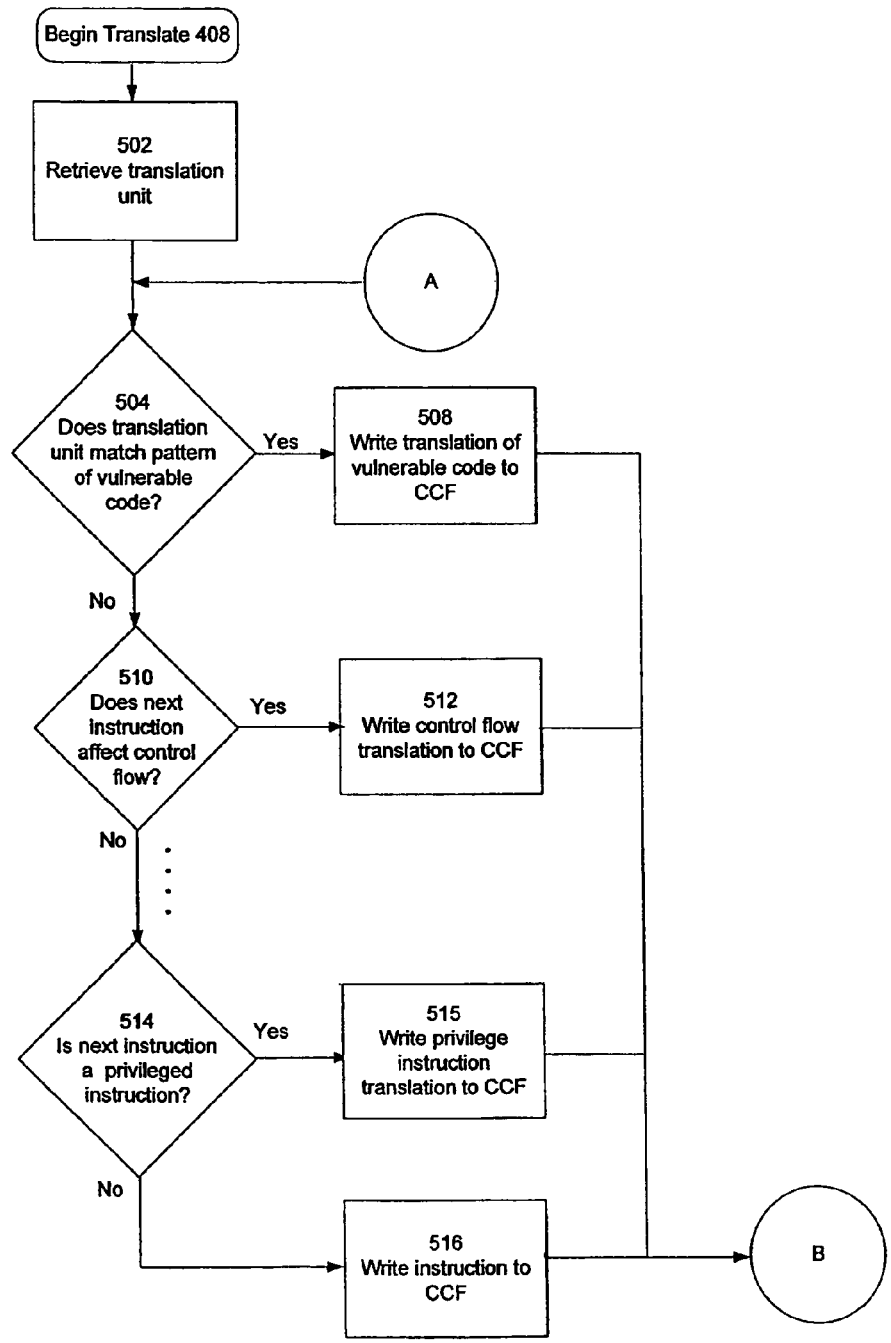
FIG. 5 is a flow chart illustrating a method for translating a segment of code, according to one embodiment of the present invention.
Figure 5B:
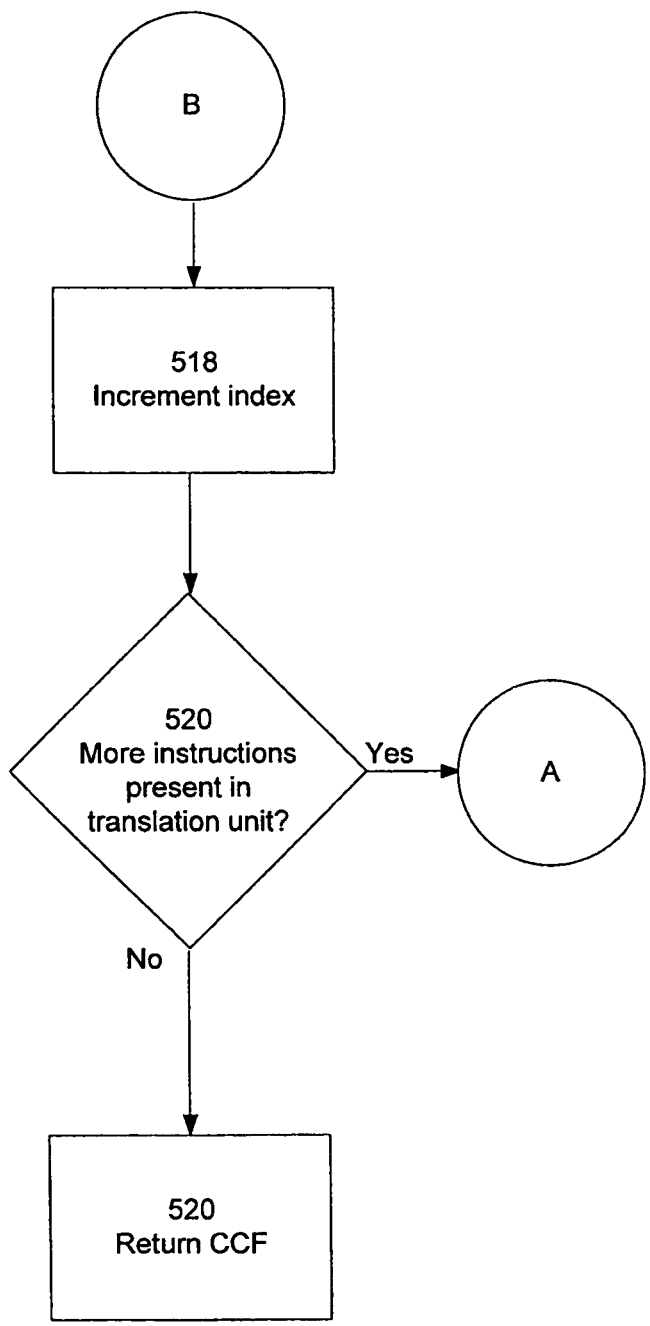

By waypoint B of FIG. 5a, some number instructions of the translation unit have been either translated and written or identically written to a compiled code fragment. The method illustrated in FIG. 5a continues in FIG. 5b.

The translator module 326 increments (Step 518) the index of the translation unit. For example, if the translation unit contains five instructions, and the first two of those instructions were determined (Step 514) to be privileged instructions and were subsequently translated and written (Step 515) to the compiled code fragment, the index of the translation unit may be incremented by two, leaving three instructions to be translated in the translation unit.

The translator module 326 determines (Step 520) if the translation unit contains more instructions. If the translator module 326 determines (Step 520) that the translation unit contains more instructions, the translator module 326 returns to Step 504. If the translator module 326 determines (Step 520) that the translation unit does not contain any more instructions (that is, that the index of the translation unit has been incremented to the end of the translation unit), the translator module 326 is finished, and returns (Step 520) the compiled code fragment.

FIGS. 1-5 have been presented as one example of a method for detecting and responding to vulnerable segments of code in translation.

According to one embodiment of the present invention, vulnerable segments of code are detected in a virtual machine monitor. It should be noted that machine virtualization could be implemented using a variety of methods. For example, code requiring special handling could be identified through the use of hardware exceptions or hardware implemented pattern matchers. As another example, the guest operating system could include code for sending messages to the virtual machine monitor identifying instructions require special handling, such as in 'para-virtualization'. The present invention is applicable to any system, either virtualized or para-virtualized, that incorporates a binary translator. The invention may be useful in any environment in which it is desirable to identify and respond to vulnerable segments of computer code.

According to another embodiment of the present invention, the detection of and response to vulnerable segments of code can be performed in a static translator. For example, computer instructions can be translated before translated computer instructions are required for execution, or can be translated by a different computer system than the one executing the translated computer instructions. According to one embodiment of the present invention, vulnerable segments of code can be detected in the translation of instructions compiled for one processor architecture to instructions compiled for another processor architecture.

According to yet another embodiment of the present invention, the detection of and response to vulnerable segments of code can be performed in an operating system or virtual machine application environment, for example, in a dynamic translator or a runtime compiler.

Figure 6:
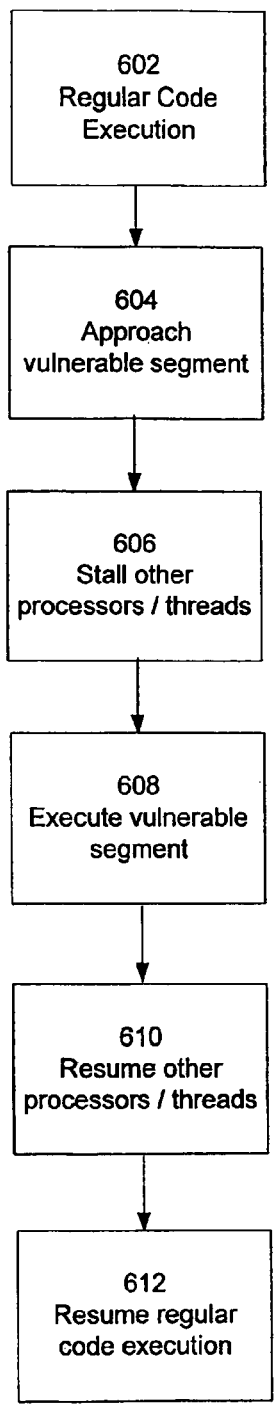
FIG. 6 is a flow chart illustrating the method of the translated code, according to one embodiment of the present invention.
Figure 7:
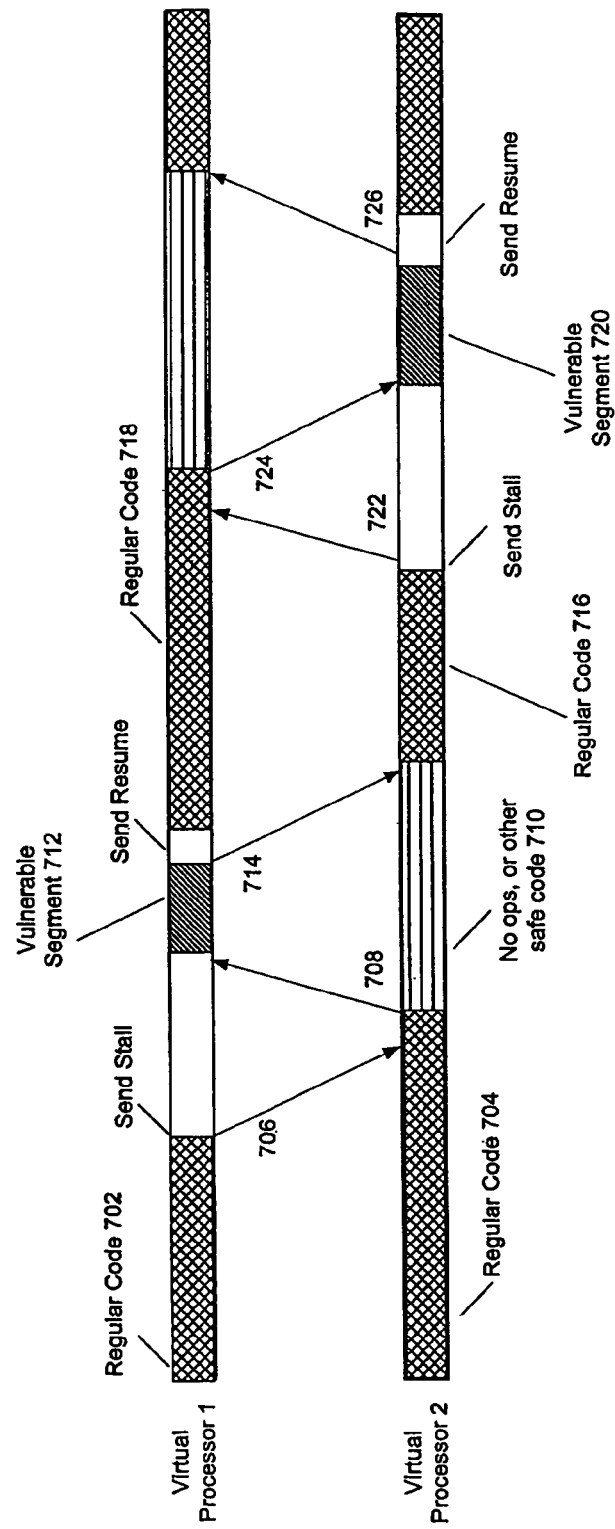
FIG. 7 is an example of how a concurrency error is avoided in multiple threads of execution according to one embodiment of the present invention.

FIGS. 6-8 illustrate examples of a translation of a vulnerable segment of code that improves the likelihood that the vulnerable segment of code will execute without an error. Specifically, FIGS. 6-8 illustrates examples of translated code that might be used as a translation of a segment of code that is vulnerable to a concurrency error among a plurality of threads of execution. The translated computer instructions may cause a virtual machine thread of execution to perform steps such as the ones illustrated in FIG. 6.

Translated computer instructions capable of causing a virtual machine thread of execution to perform steps such as the ones illustrated in FIG. 6 may be generated in response to the identification of a vulnerable segment of code, or they may be generated ahead of time, for example by a static translator.

FIG. 6 is a flow chart illustrating the method of the translated computer instructions, according to one embodiment of the present invention. According to one embodiment of the present invention, the translated code is executed by a virtual processor, such as VCPU0 108A. According to one embodiment of the present invention, the first virtual machine thread of execution may be implemented in any number of ways, for example, as another virtual processor, another thread, or another physical processor.

FIG. 7 is an example of how the likelihood of encountering a concurrency error among a plurality of virtual machine threads of execution can be reduced in the translation of the vulnerable segment of code, according to one embodiment of the present invention. The flow of instructions through a first virtual machine thread of execution is illustrated in the rectangle labeled Virtual Processor 1, and the flow of instructions through a second virtual machine thread of execution is illustrated in the rectangle labeled Virtual Processor 2. For the purposes of illustration, Virtual Processor 1 has been selected as an example of a first virtual machine thread of execution and Virtual Processor 2 has been selected as an example of a second virtual machine thread of execution a second virtual machine thread of execution is shown as being executed by Virtual Processor 2. Other examples of virtual machine threads of execution, such as the ones described herein with reference to FIG. 6, may be implemented without departing from the scope of the present invention.

The virtual processor executes (Step 602) regular code. The virtual processor may execute regular code directly, or it may execute regular code from a translation cache. In this context the term 'regular code' is used to described code that has not been identified to be vulnerable to the concurrency error. Regular code may be code that has already been translated, for example code that is executing from a translation cache of a virtual machine monitor, or it may be code that has not been translated, for example code that is directly executed.

Referring to FIG. 7, the regular code is depicted with cross-hatches. On the left of the timeline, Virtual Processor 1 is executing regular code 702. Virtual Processor 2 is executing regular code 704.

The virtual processor approaches (Step 604) a vulnerable segment of code. The vulnerable segment of code could contain, for example, a concurrency error related to a race condition. According to one embodiment of the present invention, approaching 604 the vulnerable segment of code includes acquiring a lock on a data structure.

The virtual processor stalls (Step 606) other virtual machine threads of execution. The virtual processor may stall other virtual machine threads of execution using a variety of methods. For example, the virtual processor may send a message to a second virtual processor instructing the second virtual processor not to execute substantive instructions until the second virtual processor receives further notice. As another example, the virtual processor may send a message to a virtual processor manager requesting that other virtual processor not execute substantive instructions until the virtual processor manager receives further notice. As yet another example, the virtual processor may acquire a lock on other virtual processors. This list of examples is given for the purposes of illustration and is not limiting. Stalling other virtual machine threads of execution may be implemented using a variety of methods without departing from the scope of the present invention.

According to one embodiment of the present invention, the virtual processor stalls (Step 606) other virtual machine threads of execution while the virtual processor holds a lock on some data structure. The other virtual machine threads of execution are stalled in the state of not having the lock on that data structure.

According to one embodiment of the present invention, the virtual processor waits to receive confirmation from the other virtual machine threads of execution before proceeding. For example, the virtual processor may wait to receive a message from a virtual processor manager indicating that other virtual machine threads of execution are stalling before proceeding.

Referring to FIG. 7, Virtual Processor 1 sends a message 706 instructing Virtual Processor 2 to stall. Virtual Processor 2 receives the message 706 to stall, and sends a message 708 back to Virtual Processor 1 indicating that Virtual Processor 2 is stalling. Virtual Processor 2 executes no ops 710, or other code which is safe to execute. The no op code is depicted with horizontal lines. For the purposes of illustration, FIG. 7 depicts Virtual Processor 1 stalling Virtual Processor 2 by sending a message. As discussed herein with reference to FIG. 6, other methods for stalling Virtual Processor 1 may be implemented without departing from the scope of the present invention.

The virtual processor executes (Step 608) the vulnerable segment of code. Referring to FIG. 7, the vulnerable segment of code 712 is depicted with diagonal lines. According to one embodiment of the present invention, the virtual processor holds a lock on some data structure when the virtual processor begins executing (Step 608) the vulnerable segment of code. As the other virtual machine threads of execution are stalled in a state of not holding a lock on that data structure, the possibility of a race condition concurrency error may be eliminated entirely. Even if the virtual processor releases the lock before execution of the vulnerable code is complete and continues to operate on data that otherwise would be protected by the lock, the stalling feature described herein eliminates the possibility of a race condition concurrency.

According to one embodiment of the present invention while the virtual machine thread of execution is executing vulnerable code, interrupts for that virtual machine thread of execution are held off so that an appropriate interrupt service routine may be executed at a later point in time. For example, interrupts may be held off and then an interrupt service routine executed after the virtual machine thread of execution has completed executing the vulnerable segment of code. Holding off interrupts during the execution of vulnerable code beneficially prevents certain concurrency errors, for example, concurrency errors related to data accessed by interrupt service routines.

According to one embodiment of the present invention, executing the vulnerable segment of code may include executing a translation of the vulnerable segment of code. For example, the vulnerable segment of code may contain privileged instructions, or other code requiring non-identical translation. According to one embodiment of the present invention, the vulnerable segment of code may contain instructions compiled for a different architecture than that of the Virtual Processor 1. Throughout this text, executing the vulnerable segment of code refers to executing either the vulnerable segment of code identically, or to executing a translation of the vulnerable segment of code. A translation of the vulnerable segment of the code may be any computer code intended to have a functionally equivalent effect on the computer system or virtualized computer system as the vulnerable segment of code (minus, perhaps, any bugs or errors contained in the vulnerable segment of code).

Referring to FIG. 7, while Virtual Processor 1 is executing the vulnerable segment of code 712, Virtual Processor 2 executes no ops, or other code which is safe to execute 710.

The virtual processor resumes (Step 610) the other virtual machine threads of execution. The virtual processor may resume other virtual machine threads of execution using a variety of methods. For example, the virtual processor may send a message to a second virtual processor instructing the second virtual processor to resume execution of computer instructions. As another example, the virtual processor may send a message to a virtual processor manager requesting that other virtual processors resume execution of computer instructions. As another example, the virtual processor may release a lock on other virtual processors. As yet another example, a virtual machine monitor may send a resume signal to the stalling virtual machine threads of execution. This list of examples is given for the purposes of illustration and is not limiting. Resuming other virtual machine threads of execution may be implemented using a variety of methods without departing from the scope of the present invention.

According to one embodiment of the present invention, the virtual processor resumes (Step 610) the other virtual machine threads of execution after the completion of the execution of the vulnerable segment 712. Referring to FIG. 7, Virtual Processor 1 sends a message 714 instructing Virtual Processor 2 to resume. After receiving message 714, Virtual Processor 2 resumes executing regular code 716.

The virtual processor resumes (Step 612) regular code execution. According to one embodiment of the present invention, resuming 612 regular code execution includes executing interrupt service routines for any interrupts that were held off during the execution 608 of the vulnerable segment of code. Referring to FIG. 7, Virtual Processor 1 resumes executing regular code 718 after sending the message 714 instructing Virtual Processor 2 to resume.

According to one embodiment of the present invention, interrupts for a stalled virtual machine thread of execution are held off until the virtual machine thread of execution is resumed. After a virtual machine thread of execution resumes from a stall, the virtual machine thread of executions executes interrupt service routines for any interrupts that were held off during the stall.

As illustrated in FIG. 7, the method of the translation could be executed by either virtual machine thread of execution. For example, after receiving the message 706 to stall, sending a message 708 confirming the stall, stalling, receiving the message 714 to resume, and resuming execution of regular code, the same Virtual Processor 2 could approach a segment of vulnerable code, send a message 722 instructing Virtual Processor 1 to stall, receive a message 724 indicating that Virtual Processor 1 is stalling, execute the vulnerable segment 720, send a message 726 instructing Virtual Processor 1 to resume, and resume execution of regular code.

In an environment having a plurality of virtual machine threads of execution, the method described herein with reference to FIG. 6 could be performed variously by any of the virtual machine threads of execution.

According to one embodiment of the present invention, by identifying a vulnerable segment of code and stalling other virtual machine threads of executions, a virtual machine thread of execution is able to reduce the likelihood of concurrency errors corrupting the virtual machine threads of execution. For example, referring to FIG. 7, the vulnerable segment 712 of Virtual Processor 1 may contain a synchronization bug that will produce undesirable results if executed concurrently with the regular code 716 of Virtual Processor 2. Stalling Virtual Processor 2 while Virtual Processor 1 executes the vulnerable segment 712 prevents the concurrent execution of the vulnerable segment and the regular code, thereby preventing a concurrency error. As another example, the vulnerable segment 712 of Virtual Processor 1 may contain a synchronization bug that will produce undesirable results if executed concurrently with the vulnerable code 720 of Virtual Processor 2. A similar method of limiting another virtual machine thread of execution to safe code may be implemented to prevent both virtual processors from executing vulnerable segments concurrently. Preventing Virtual Processor 2 from executing vulnerable segment 720 while Virtual Processor 1 executes vulnerable segment 712 may prevent the concurrency error.

FIG. 8 illustrates the stalling and resuming of multiple virtual machine threads of execution in response to the identification of a vulnerable segment of code, according to one embodiment of the present invention. For the purposes of illustration, FIG. 8 depicts a method by which a first virtual thread could stall a plurality of other virtual threads. This example has been chosen for the purposes of illustration only; other examples of virtual machine threads of execution stalling other virtual machine threads of execution could have been chosen and would not be beyond the scope of the present invention.

Figure 8A:
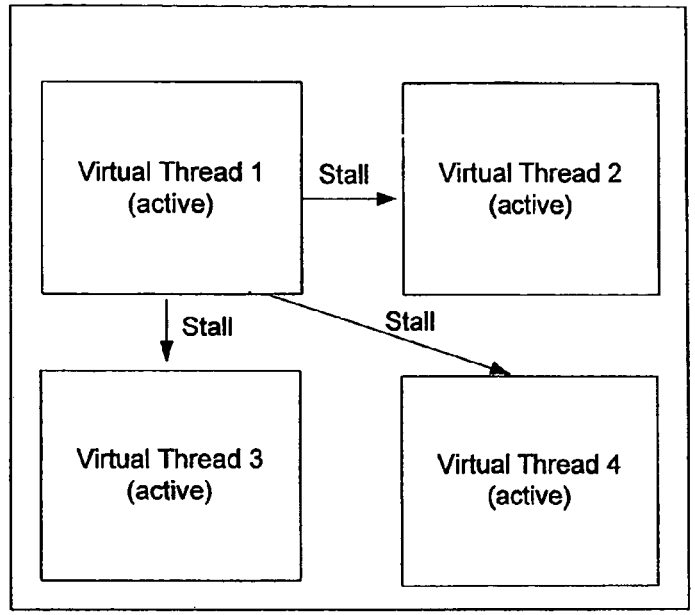
FIG. 8 illustrates the stalling and resuming of multiple virtual machine threads of execution, according to one embodiment of the present invention.

FIG. 8a depicts four virtual threads actively executing code (as throughout, the virtual threads can be referred to as virtual processors). One of the virtual threads, Virtual Thread 1, has identified a vulnerable segment of code. Virtual Thread 1 sends a stall message to the other threads, Virtual Threads 2-4.

Virtual Thread 1 could send a stall message using an inter-thread communication process, such as a posix signal.

Figure 8B:
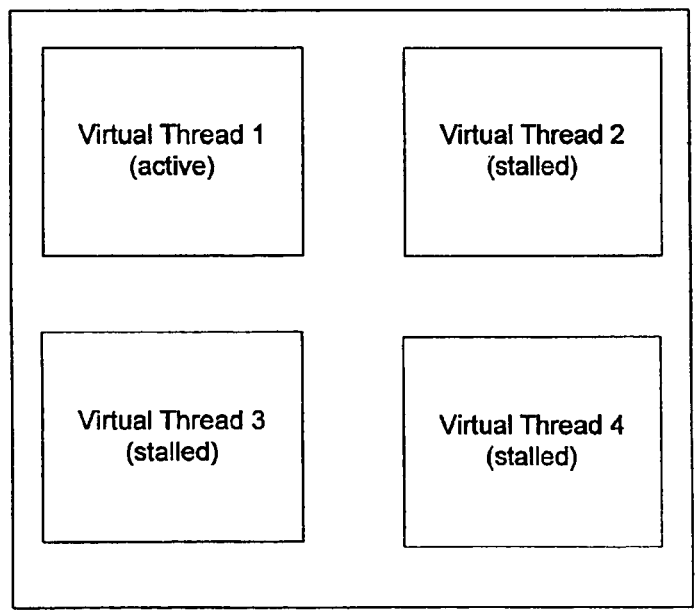

FIG. 8b depicts one virtual thread actively executing code and three virtual threads stalled. Virtual Thread 1 may at this point execute the vulnerable segment of code, or a translation of the vulnerable segment of code. Virtual Threads 2-4 are stalled. Virtual Threads 2-4 may be stalled for example, by denying them runtime on the CPU 120, by replacing their instructions with filler instructions, or by relegating them to safe instructions. According to one embodiment of the present invention, Virtual Thread 1 waits for confirmation that Virtual Threads 2-4 have stalled before executing the vulnerable segment of code.

Figure 8C:
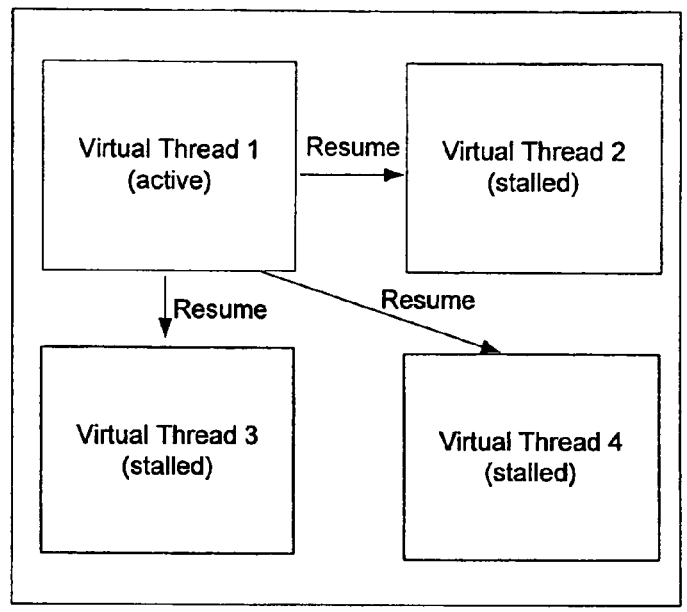

FIG. 8c depicts one virtual thread actively executing code and three virtual threads stalled. Virtual Thread 1 has finished executing the vulnerable segment of code, or the translation of the vulnerable segment of code. Virtual Thread 1 sends a resume message to the other threads, Virtual Threads 2-4.

Figure 8D:
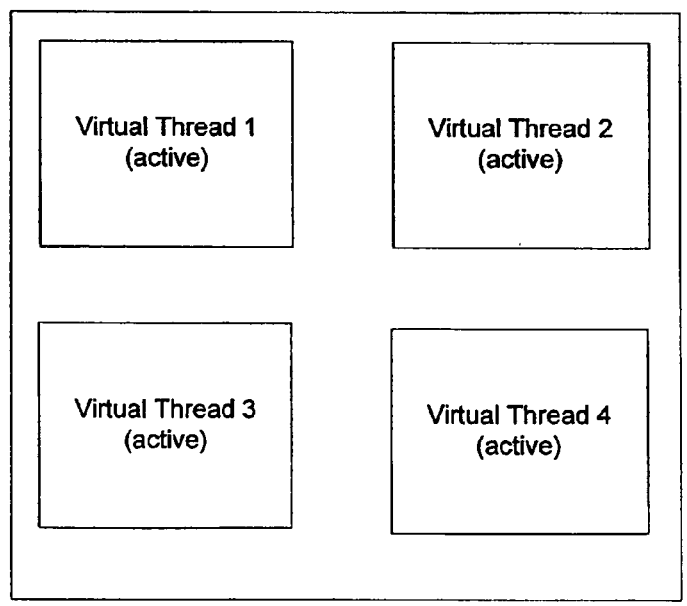

FIG. 8d depicts four virtual threads actively executing code. The four virtual threads execute regular code until one of the threads identifies a vulnerable segment of code in its instructions, at which point the cycle depicted in FIG. 8 may repeat with the virtual thread that identified the vulnerable segment of code in its instructions assuming the role played by Virtual Thread 1.

According to one embodiment of the present invention, by identifying a vulnerable segment of code and stalling other virtual machine threads of executions, a virtual machine thread of execution is able to reduce the likelihood of concurrency errors corrupting the virtual machine threads of execution.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. In a computer system comprising a plurality of virtual machine threads of execution, a method for responding to a vulnerable segment of computer code, the method comprising the steps of:

executing a first virtual machine thread of execution using physical resources of the computer system, said first virtual machine thread of execution comprising computer code;

identifying, at runtime using a binary translator, a vulnerable segment within said computer code of said first virtual machine thread of execution, wherein said vulnerable segment comprises computer instructions containing a synchronization bug; and translating the vulnerable segment using the binary translator to create a translated vulnerable segment, the translating comprising remediating the synchronization bug by introducing code to the translated vulnerable segment that is not present in the vulnerable segment, the introduced code causing a second virtual machine thread of execution to stall during execution of said translated vulnerable segment.

2. The method of claim 1, wherein said vulnerable segment includes instructions for acquiring a lock on a data structure, and said introduced code to the translated vulnerable segment includes instructions for stalling the second virtual machine thread of execution while the lock on the data structure is held by the first virtual machine thread of execution.

3. The method of claim 1, wherein said first virtual machine thread of execution is executed by a first virtual processor.

4. The method of claim 3, wherein said second virtual machine thread of execution is executed by a second virtual processor, the first and second virtual processors being distinct from each other.

5. The method of claim 3, wherein the second virtual machine thread of execution is also executed by said first virtual processor.

6. The method of claim 1, wherein said first virtual machine thread of execution stalls said second virtual machine thread of execution by sending a message to said second virtual machine thread of execution.

7. The method of claim 1, wherein said second virtual machine thread of execution executes on a second virtual processor and the stalling of the second virtual machine thread of execution comprises acquiring a lock and on said second virtual processor.

8. The method of claim 1, wherein said vulnerable segment of said computer code of said first virtual machine thread of execution is identified by a pattern matcher component of the binary translator.

9. The method of claim 1, further comprising the steps of:
executing said translated vulnerable segment; and
resuming said second virtual machine thread of execution after the executing of the translated vulnerable segment.

10. The method of claim 9, wherein said step of resuming includes the step a step of sending a message to said second virtual machine thread of execution.

11. The method of claim 9, wherein said second virtual machine thread of execution executes on a second virtual processor and said resuming of said second virtual machine thread of execution includes releasing a lock on said second virtual processor.

12. The method of claim 9, further comprising the steps of:
receiving an interrupt for said first virtual machine thread of execution while said first virtual machine thread of execution is executing said vulnerable segment; and
executing an interrupt service routine for the interrupt after said first virtual machine thread of execution has completed said executing said vulnerable segment.

13. A method, for translating computer instructions to be executed by a first virtual machine thread of execution, the method comprising the steps of:
translating computer instructions to be executed by a first virtual machine thread of execution using physical resources of the computer system;
identifying, at run time using a binary translator, a vulnerable segment of code in the first virtual machine thread of execution wherein said vulnerable segment comprises computer instructions containing a synchronization bug; and
writing translated computer instructions that are not present in the vulnerable segment to a computer readable medium, wherein the translated computer instructions include computer code in said first virtual machine thread of execution for stalling a second virtual machine thread of execution before executing said vulnerable segment of code.

14. The method of claim 13, wherein said computer code in said first virtual machine thread of execution for stalling a second virtual machine thread of execution comprises computer code to be executed by a first physical processor for stalling a second physical processor.

15. A system comprising:
a processor; and
a memory having stored thereon instructions which, when executed by the processor, cause the processor to:
execute a first virtual machine thread of execution using physical resources of the computer system, said first virtual machine thread of execution comprising computer code;
identify, at runtime using a binary translator, a vulnerable segment within said computer code of said first virtual machine thread of execution, wherein said vulnerable segment comprises computer instructions containing a synchronization bug; and
translate the vulnerable segment using the binary translator to create a translated vulnerable segment, the translating comprising remediating the synchronization bug by introducing code to the translated vulnerable segment that is not present in the vulnerable segment, the introduced code causing a second virtual machine thread of execution to stall during execution of said translated vulnerable segment.

16. The system of claim 15, wherein identifying the vulnerable segment of code containing a synchronization error comprises detecting whether the segment of code matches a pattern of a predetermined segment of computer code.

17. The system of claim 15, additionally comprising: a virtual machine monitor, wherein the translating of the vulnerable segment is selectively activated by said virtual machine monitor.

18. A non-transitory machine readable medium containing a computer program for translating computer instructions to be executed by a first virtual machine thread, the computer program comprising:
computer code for identifying, at runtime using a binary translator, a vulnerable segment of code, the vulnerable segment of code containing a synchronization bug;
remediating the synchronization bug by introducing code to translated computer instructions not present in the vulnerable segment; and
computer code for writing said translated computer instructions to a second computer-readable medium, said translated computer instructions containing instructions from the vulnerable segment of code and including computer code causing a second virtual machine thread of execution to stall during execution of said translated computer instructions.

19. The method of claim 18, wherein the first computer-readable medium comprises said second computer-readable medium.

20. The system of claim 15, wherein the introduced computer code that causes said second virtual machine thread of execution to stall comprises computer code for sending a message to said second virtual machine thread of execution.

* * * * *